United States Patent
Dixon et al.

[11] Patent Number: 6,004,183
[45] Date of Patent: *Dec. 21, 1999

[54] HIGH PERFORMANCE YO-YO

[75] Inventors: Arne W. Dixon, 23126 14$^{th}$ Dr. SE., Bothell, Wash. 98021; Don Heaverlo, Bothell, Wash.

[73] Assignee: Arne W. Dixon, Bothell, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/828,708

[22] Filed: Mar. 31, 1997

[51] Int. Cl.$^6$ ....................................................... A63H 1/30
[52] U.S. Cl. .............................................................. 446/250
[58] Field of Search ................................... 446/250, 251, 446/255

[56] References Cited

U.S. PATENT DOCUMENTS

| | | | |
|---|---|---|---|
| 3,175,326 | 3/1965 | Isaacson | 46/61 |
| 3,256,635 | 6/1966 | Radovan | 46/61 |
| 3,805,443 | 4/1974 | Duncan, Jr. | |
| 3,921,932 | 11/1975 | Whitehead, Sr. | 242/130.2 |
| 4,207,701 | 6/1980 | Kuhn | |
| 4,236,773 | 12/1980 | Mertes | 312/341 R |
| 4,332,102 | 6/1982 | Caffrey | |
| 4,552,542 | 11/1985 | Reysman | 446/254 |
| 4,681,553 | 7/1987 | Rodarte | |
| 4,895,547 | 1/1990 | Amaral | |
| 5,017,172 | 5/1991 | Seifert | 446/250 |
| 5,100,361 | 3/1992 | Kuhn et al. | |
| 5,389,029 | 2/1995 | McAvoy, Jr. | 446/250 |
| 5,452,501 | 9/1995 | Kramer et al. | 29/11 |

Primary Examiner—Kien T. Nguyen
Assistant Examiner—Laura Fossum
Attorney, Agent, or Firm—Ann W. Speckman; Janet Sleath

[57] ABSTRACT

A high performance yo-yo incorporates an axle ball bearing comprising non-metallic inner and outer races mounted on the central axle. A full complement axle bearing including non-metallic inner and outer races with matching grooves for retaining a plurality of balls between the bearing races is disclosed. Applicants have found, unexpectedly, that this type of bearing has highly desirable low friction characteristics that provide a long spin time, yet permit retrieval of the yo-yo upon command by a simple flick of the wrist. The central axle mounted in one of the yo-yo components is removably engageable in a sleeve mounted in the other yo-yo component to provide a yo-yo that is easily and conveniently assembled and disassembled.

17 Claims, 2 Drawing Sheets

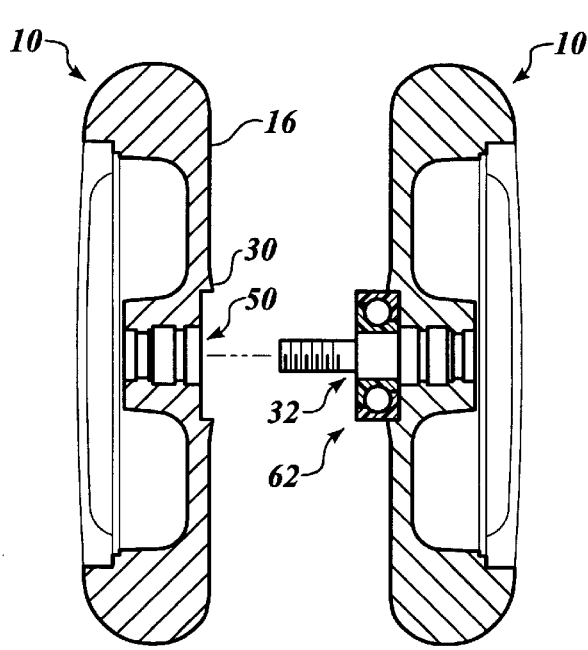
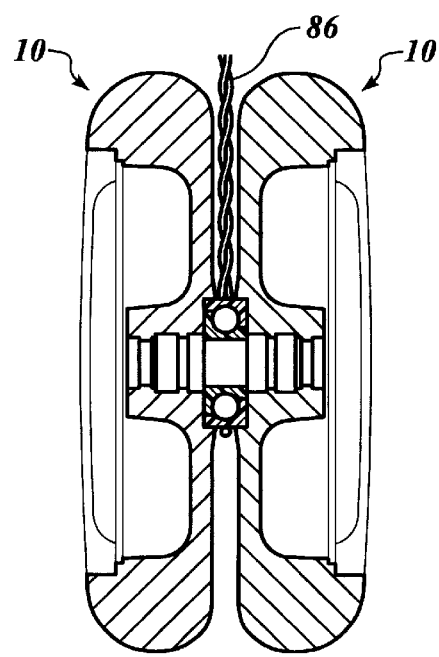
Fig.1
Fig.2
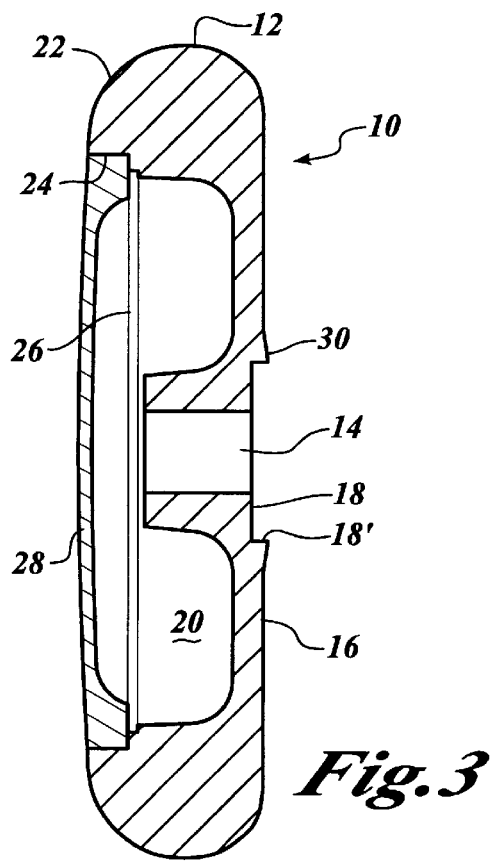
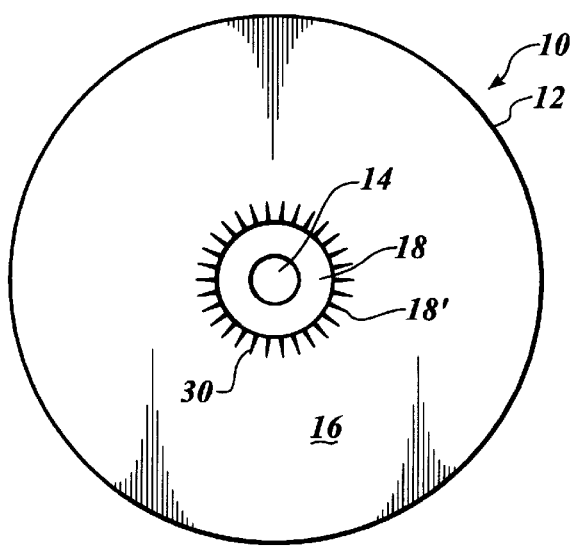
Fig.3
Fig.4

HIGH PERFORMANCE YO-YO

FIELD OF THE INVENTION

The present invention relates to a high performance yo-yo that has superior performance capabilities including the ability to spin freely, or sleep, and is retrievable by the operator upon command.

BACKGROUND OF THE INVENTION

Yo-yos have provided countless hours of entertainment to children and adults alike for many years. Generally speaking, yo-yos comprise two matching disc-shaped components oriented in a mirror-image arrangement and fixed in relation to one another on a central axle. A string, which functions as a tether, is mounted on and winds around the central axle as the yo-yo is released and retracted. Many yo-yo design features have been adopted over the years to confer different performance properties.

Among the desirable features of a high performance yo-yo is that it spin freely at the end of its string for as long a time as possible before the spin action ceases, this feature being referred to as "sleeping." Many yo-yo tricks incorporate maneuvers that are performed while the yo-yo is sleeping. Early yo-yos were assembled with one end of the string captured between the axle and one side of the yo-yo. Such yo-yos cannot spin, or sleep, at the end of the string and therefore cannot perform a majority of the known yo-yo tricks, specifically those that require the yo-yo to sleep. More recently, many yo-yos have used a detachable string looped around the axle and leading from the axle to the player's hand. Using this technique, the yo-yo is left free to spin or "sleep" for a time, thus allowing the user to perform certain tricks.

A sleeping yo-yo must be "waked," or caused to engage the string at the axle, to initiate rewinding of the string. Capstan friction, which occurs between the portion of the string looped around the axle and the peripheral surface of the rotating axle, is required to initiate the rewinding of the string. Capstan friction between the string and the axle, necessary to wake the yo-yo, also acts to limit spin and playability. If the friction is reduced sufficiently to produce long spin time, some other provision must be made to permit the yo-yo to be returned to the player. The trade-offs between long spin, which requires low capstan friction and waking, or retraction, which requires a certain level of capstan friction to initiate the return, have generally required compromises in the design and playability of the yo-yo.

U.S. Pat. No. 3,175,326 discloses a yo-yo incorporating an anti-friction bearing fixed on the central shaft, which is fixed on the disc components. This bearing yo-yo has a long spin time, but requires the string to become wedged in a wedge ring or between the bearing and the disc to return the yo-yo to the user's hand. This provides uncertain and unpredictable return characteristics. Lodging of the string in a groove or wedge ring also tends to chafe the string and produce uneven windings that may result in uneven yo-yo travel and reduces string life. Moreover, because the central shaft and the bearing ere fixed, the yo-yo cannot be disassembled. The bearing cannot be cleaned or lubricated, and the string cannot be safely replaced.

U.S. Pat. No. 3,805,443 discloses a yo-yo design in which the side caps are removable and maximum weight is distributed in the outer periphery of the yo-yo body. Distribution of greater than 80% of each yo-yo body in the outer annular portion produces a flywheel effect and provides longer spin times that are desirable for performing tricks. The yo-yo also features a spool mounted on the central axle to reinforce the thin-walled central areas of the yo-yo bodies.

Yo-Yos having the capability of being dismantled and reassembled are known. U.S. Pat. No. 4,207,701 discloses a yo-yo in which the center axle, including a string guide, is removable and replaceable. This feature is important when hardwood axles are used to lend the desired "feel" of the classic yo-yo and the "sleeping" characteristics. Hardwood tends to become polished by repeated contact with the string, which reduces capstan friction and thus reduces the playability of the yo-yo. This patent also discloses an arrangement whereby either of the two body portions may be oriented in either of two orientations. Depending on the configuration of the body portions, several yo-yo configurations are possible.

U.S. Pat. No. 4,332,102 discloses a yo-yo in which the string is attached to a solid pulley bearing mounted on the central shaft. The patent observes that placing a solid plastic bearing between the yo-yo string and the central shaft increases the spin time of the yo-yo. This design incorporates centrifugal clutch mechanisms mounted in the body portions and engaging the sides of the bearing pulley to engage the gearing pulley as the yo-yo's rotational rate slows and thus provide retrieval of the yo-yo. The centrifugal clutches are only effective to retrieve the yo-yo, however, and they add significantly to the cost and mechanical complexity of the yo-yo. Moreover, yo-yos having a clutch mechanism generally have limited capability to perform many tricks, because the clutch diminishes the length of spin time and may engage sooner than desired during the performance of tricks.

U.S. Pat. No. 4,895,547 discloses a yo-yo in which a low friction solid polymeric spool is rotatably mounted on the central axle so that the axle rotates freely within the spool. The spool may be formed from a polymeric material having good lubricity properties, such as acetal. In practice, lubricant must be applied regularly to the axle to maintain the necessary frictional characteristics of the axle and the spool that permit retrieval of the yo-yo. When the lubricant wears off, there is insufficient friction to properly return the yo-yo to the player. The spool preferably has a circumferential groove for receiving the string. This patent also discloses the use of radially extending ribs surrounding the axle sockets in a starburst pattern. The ribs enhance the ability of the yo-yo to engage the string when retrieving, or waking the yo-yo.

U.S. Pat. No. 5,100,361 recognizes that the deliberate reduction or elimination of capstan friction has resulted in the need for some other interaction between the string at the axle and the rotating parts of the yo-yo to initiate rewinding of the string. The '361 patent discloses a yo-yo having an axle bearing in which the gap between the two yo-yo halves is adjustable to vary the amount of friction and therefore vary the performance properties of the yo-yo. The adjustability of this yo-yo to provide different performance properties for different levels of players is beneficial primarily for advanced players. Less skilled players would have difficulty adjusting the yo-yo to provide performance capabilities suitable for their skill level.

As is evident from the review of prior art patents, many yo-yo designs have been proposed with the objective of long spin time. Long spin times have been achieved, but the use of long spinning yo-yos is generally confined to experts and often the reduced friction at the axle makes return of the yo-yo more difficult for less experienced users. Complex and expensive mechanisms, such as centrifugal clutches, have been incorporated to provide a yo-yo having a relatively long spin time that can be returned to the player and played by a less experienced player or novice. There remains a need in the art for a yo-yo that has a simple mechanical design, that can be easily and inexpensively maintained, and that exhibits long spinning characteristics which permit the user to perform tricks, yet is returnable to the user easily with a simple flick of the wrist.

Low friction axle ball bearings have been incorporated in long-spinning yo-yos. To applicants' knowledge, all of the axle ball bearings incorporated in yo-yos to date have included races constructed from metallic materials such as steel. High precision metallic bearings comprising a plurality of metallic balls retained in precisely machined inner and outer metallic races have been used to provide the required low friction characteristics. High precision metallic bearings generally require use of lubricants, which may necessitate cleaning and maintenance, and which may affect the performance of the yo-yo under different temperature and humidity conditions. Such metallic axle bearings tend to corrode over time, and also contribute substantially and detrimentally both to the weight at the center of the yo-yo and to the cost of the yo-yo.

SUMMARY OF THE INVENTION

The high performance yo-yo of the present invention incorporates many of the performance features described above, yet it has a simple mechanical design and can be assembled and disassembled easily by any user. An axle having a bearing surface and threaded at one end is centrally affixed in one of the disc components, and an internally threaded sleeve for receiving the threaded portion of the axle is centrally mounted in the matching disc component. The central axle is therefore mountable in each of the yo-yo components to maintain the components in spaced relationship with respect to one another. According to preferred embodiments, the yo-yo can be assembled and disassembled simply by rotating the disc components in opposite directions with respect to one another.

The yo-yo of the present invention incorporates a bearing assembly comprising non-metallic inner and outer races mounted on the central axle. A preferred axle bearing assembly is referred to as a full complement bearing. The full complement bearing assembly comprises non-metallic inner and outer races having matching grooves for retaining a plurality of balls between the bearing races. The inner and outer races are preferably composed of a smooth, polymeric material having a natural lubricity, such as acetal. Applicants have found, unexpectedly, that this type of bearing has highly desirable low friction characteristics that provide a long spin time, yet permit retrieval of the yo-yo upon command by a simple flick of the wrist. This type of axle bearing is noncorrosive, does not require any lubricant, can be easily and conveniently cleaned by washing in soap and water, and is relatively inexpensive. Its operational characteristics do not change as a result of extreme variations in temperature or humidity. Additionally, the axle bearing used in the high performance yo-yo of the present invention is lightweight and therefore doesn't contribute significantly to the weight at the center of the yo-yo. Finally, the axle bearing in the high performance yo-yo of the present invention makes a whooshing noise as it is played that contributes to the uniqueness and desirability of the yo-yo and helps the player recognize where the yo-yo is in its cycle of performance.

BRIEF DESCRIPTION OF THE FIGURES

The invention will be described below in detail with reference to the following figures, in which:

FIG. 1 shows an enlarged partially cross-sectional view of a yo-yo of the present invention in a disassembled condition in which the two yo-yo components are separated;

FIG. 2 shows an enlarged partially cross-sectional view of a yo-yo of the present invention in an assembled condition with a string mounted on the axle bearing;

FIG. 3 shows an enlarged cross-sectional view of a yo-yo disc component according to the present invention;

FIG. 4 shows an enlarged plan view of the inner surface of a yo-yo disc component according to the present invention;

DESCRIPTION OF PREFERRED EMBODIMENTS

Figure 5:
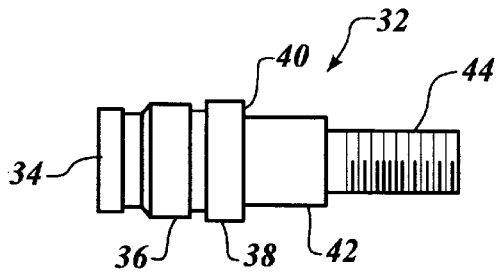
FIG. 5 shows an enlarged plan view of an axle of a yo-yo of the present invention.

As shown in FIGS. 1 and 2, the yo-yo of the present invention comprises two matching yo-yo disc components 10 which may be assembled and disassembled by engagement of a threaded portion of central axle 32 mounted in one of the disc components in threaded sleeve 50 mounted in the other disc component. The inner race of axle bearing 62 is retained on a bearing surface of central axle 32, while the yo-yo string rides on the outer race of axle bearing 62. Important features of these components and important relationships among the components are described in detail below.

Yo-yo disc components 10 are preferably identical and assembled in a mirror image configuration. Disc components 10 are preferably constructed from high density plastics, with the bulk of the weight distributed toward the periphery of the disc. As illustrated in FIG. 3, disc components 10 of the present invention have a rounded, smooth peripheral surface 12 and a central bore 14 penetrating inner surface 16 for receiving a central axle or sleeve. Recess 18 forming shoulder 18' is provided concentric with central bore 14 and is sized slightly larger than the outer diameter of the outer bearing race so that the outer bearing race rotates freely in shoulder 18'.

Inner surface 16 of each disc component 10 preferably has a series of ridges 30 arranged radially around shoulder 18', as illustrated in FIG. 4. Ridges 30 are provided in a "sunburst" pattern and, when the yo-yo is fully extended or spinning, the yo-yo string contacts ridges 30 to provide added friction to retrieve the yo-yo. Applicants' research indicates that the arrangement and dimensions of the ridges are important. Specifically, a sunburst pattern having from about 20 to about 36 ridges, preferably from about 28 to 32 ridges, and most preferably about 30 ridges, arranged radially around shoulder 18' is preferred. The surface of each ridge adjacent shoulder 18' preferably projects about 0.005 to about 0.015 of an inch, and most preferably about 0.008 of an inch, from the plane of inner surface 16. Each ridge is preferably about 0.010 to about 0.024 of an inch wide, and most preferably about 0.016 of an inch wide where it is adjacent shoulder 18'. Each ridge 30 preferably extends radially for a length of about 0.060 to about 0.120 of an inch, with a length of about 0.090 of an inch being especially preferred. Each ridge is tapered evenly from a maximum projection or height adjacent shoulder 18' along its length until it meets the plane of inner surface 16. The arrangement and dimensions of ridges 30 forming the sunburst are important features and contribute significantly to the performance characteristics of the yo-yo.

Yo-yo disc components 10 preferably incorporate one or more internal cavities to reduce the weight of the disc components. In a preferred design, annular cavity 20 is provided to reduce the weight of the disc components and skew the weight distribution toward the periphery of the disc components to provide a flywheel effect as the yo-yo spins. Outer surface 22 of disc component 10 preferably has a recess 24 in which a disc 26, such as decorated artwork, can be placed. Lens 28 can be snap-fit in recess 24 to seal the disc 26 inside the yo-yo component and to provide a smooth outer surface. Lens 28 is preferably configured to reduce weight as well. Disc components 10 are preferably constructed from a high density, rigid, moldable material, such as polycarbonate, ABS or the like, and are preferably injection molded and finished with smooth surfaces. Suitable materials of construction and molding techniques are well known in the art.

Axle 32 and threaded sleeve 50 are mounted in central bores 14 of matching yo-yo disc components 10. Axle 32 and threaded sleeve 50 are constructed from a non-corrosive, hard material, such as brass, and are preferably machined to provide high precision surfaces and threads. Axle 32 is illustrated in FIG. 5 and comprises a mounting end 34 with a knurled surface 36 and smooth rim 38 that is rigidly mounted in central bore 14 of yo-yo disc component 10. The outer diameter of smooth rim 38 matches the inner diameter of central bore 14, and axle 32 is mounted in central bore 14 such that shoulder 40 of smooth rim 38 is substantially flush with the floor of recess 18. Axle bearing surface 42 is provided as a smooth surface having a diameter matched to receive the inner bearing race. The inner bearing race is freely rotatable on axle bearing surface 42 when the bearing is in a non-load bearing condition. The width of axle bearing surface 42 is slightly greater than the width of axle bearing 62. Finally, threaded portion 44 of central axle 32 projects from the axle bearing surface and is configured to be engaged in threaded sleeve 50.

Figure 6:
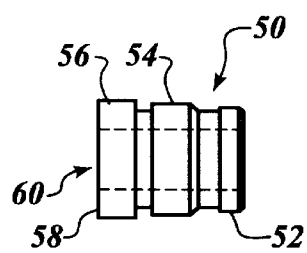
FIG. 6 shows an enlarged plan view of a threaded sleeve of the yo-yo of the present invention.

Threaded sleeve 50, shown in FIG. 6, comprises a mounting end 52 with a knurled surface 54 and smooth rim 56 that are rigidly mounted in central bore 14 of yo-yo disc component 10. The outer diameter of smooth rim 56 matches the inner diameter of central bore 14, and threaded sleeve 50 is mounted in central bore 14 such that shoulder 58 of smooth rim 56 is substantially flush with the floor of recess 18. Internally threaded portion 60 is provided to receive threaded portion 44 of central axle 32. Threaded portion 44 of central axle 32 and internally threaded portion 60 of sleeve 50 cooperate so that bearing surface 42 is centered between the yo-yo components when they're in the assembled condition.

Axle 32 and threaded sleeve 50 are preferably ultrasonically welded in the respective central bores 14 of yo-yo disc components 10 to provide a high precision plastic to metal bond. The yo-yo may be assembled and disassembled simply by rotating the opposing yo-yo disc components with respect to one another and threading or unthreading threaded portion 44 of axle 32 in internally threaded portion 60 of sleeve 50. The desired gap G, shown in FIG. 2, between planar surfaces 16 of yo-yo disc components 10 in the assembled yo-yo is preferably from about 0.080 inch to about 0.130 of an inch, and most preferably about 0.102 of an inch.

Figure 7:
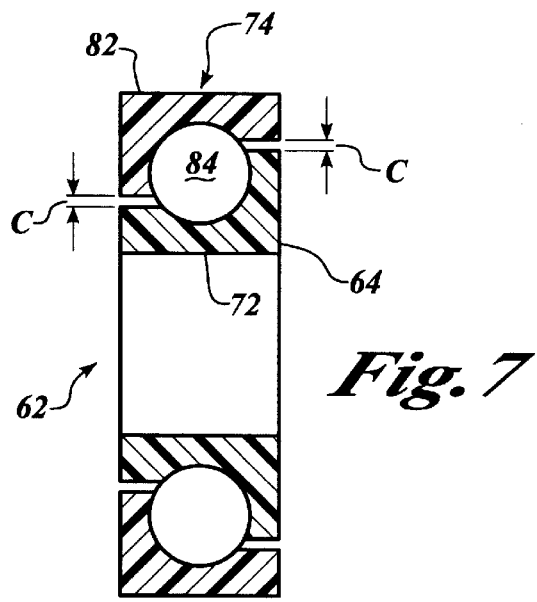
FIG. 7 shows an enlarged cross-sectional view of a full complement axle bearing assembly according to the present invention.

Axle bearing assembly 62 is illustrated in FIG. 7 and is shown mounted on bearing surface 42 of central axle 32 in FIGS. 1 and 2. Axle bearing 62 is an important feature of the high performance yo-yo of the present invention and comprises non-metallic inner and outer races 64 and 74, respectively, and a plurality of balls 84. Axle bearing 62 is preferably a full complement bearing assembly that does not include a bearing cage.

Figure 8:
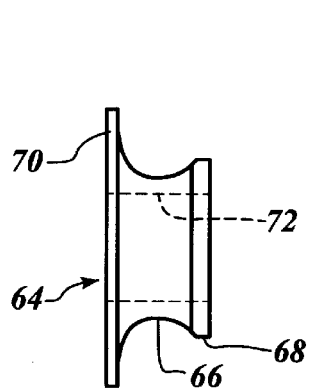
FIG. 8 shows an enlarged side view of an inner bearing race of the bearing assembly preferred for use in the yo-yo of the present invention.
Figure 9:
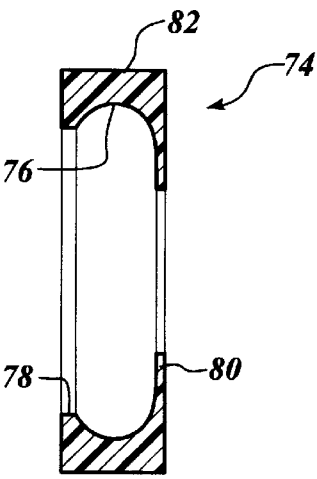
FIG. 9 shows an enlarged side view of an outer bearing race of the bearing assembly preferred for use in the yo-yo of the present invention.

As illustrated in FIGS. 8 and 9, inner and outer bearing races 64 and 74 have matching grooves 66 and 76, respectively, for receiving and retaining a plurality of balls 84. The combination and arrangement of lands 68 and 78, flanges 70 and 80, and inner and outer bearing surfaces 72 and 82, respectively, act to retain the balls in the grooves and simultaneously maintain the inner and outer races in alignment and freely rotatable condition with respect to one another. According to preferred embodiments, bearing surface 82 of outer bearing race 74 has a diameter of from about 0.30 of an inch to about 0.70 of an inch, and most preferably about 0.50 of an inch. Inner bearing surface 72 of inner bearing race 64 preferably has a diameter of from about 0.10 of an inch to about 0.30 of an inch, and most preferably about 0.187 of an inch.

Figure 10:
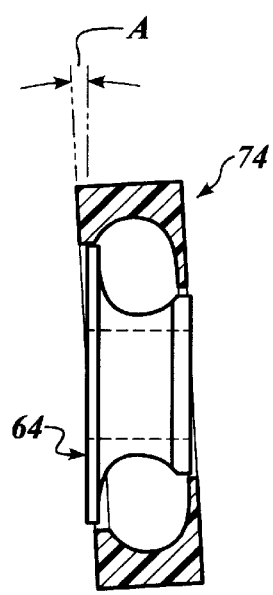
FIG. 10 shows a highly schematic representation of the axial play of the bearing assembly preferred for use in the yo-yo of the present invention.

When the bearing is assembled, balls 84 are retained in the annular cavity formed by grooves 66 and 76 and, in combination with lands 68 and 78, also function to hold the inner and outer races in the assembled and aligned condition. As illustrated schematically in FIG. 10, preferred bearing assemblies are constructed to permit a degree of axial play between the inner and outer races. Axial play may be permitted, for example, by providing clearance C, as shown in FIG. 7, between the flanges and lands of the inner and outer races. The desired clearance between the inner and outer races is from about 0.003 to about 0.010 of an inch, and most preferably from about 0.005 of an inch to about 0.006 of an inch. Axial play permitting the inner and outer races to move at an angle A of up to about 5° in either direction from alignment on the X-Y axis, as shown in FIG. 10, is preferred.

Preferred low friction axle bearings for use in the yo-yos of the present invention comprise non-metallic inner and outer races. Preferred materials of construction include lightweight thermoplastic materials such as polymeric materials, and most preferably comprise acetal. Polymeric materials such as acetal have a natural lubricity and do not require any lubricants. Such materials are also considerably less dense than metallic materials and therefore provide lighter weight bearings. As a result of the lighter weight of polymeric materials, larger diameter bearings that confer advantageous performance properties can be used. Additionally, use of lightweight axle bearings permit construction of yo-yos having greater weight at the periphery of the yo-yo components, which provides a desirable flywheel effect when the yo-yo is played.

A plurality of balls 84 are retained in an annular cavity formed by grooves 66 and 76 of inner and outer races 64 and 74, respectively. The preferred number and dimension of the balls may vary as a function of the desired dimensions of inner and outer bearing surfaces. According to a preferred embodiment, axle bearing 62 comprises eleven balls, each having a diameter of about 0.0935 of an inch. Balls 84 are preferably metallic, and preferably comprise case-hardened carbon steel. Bearing assemblies having non-metallic inner and outer races are commercially available.

The dimensions of inner and outer bearing race surfaces 72 and 82 and the cooperation of bearing race surfaces with axle bearing surface 42 and yo-yo string 86 also provide important performance properties. Inner bearing race surface 72 has a diameter slightly larger than the diameter of axle bearing surface 42 such that the inner bearing race surface slides on and rotates freely on the axle bearing surface when the bearing is in a no-load condition. When the yo-yo is played and the bearing is in a loaded condition, however, inner bearing race surface 72 does not rotate to any appreciable degree on axle bearing surface 42.

Yo-yo string 86 is looped around and retained on outer bearing race surface 82. An outer bearing race having a diameter of about 0.50 of an inch is preferred for yo-yos of the present invention. The larger diameter outer bearing race surface provides good load distribution and reduces string shock, resulting in reduced string fatigue and wear. The high performance yo-yo of the present invention may utilize yo-yo strings 86 having a variety of qualities, compositions and elasticities, depending on the performance characteristics desired. String 86 is preferably looped once around outer bearing race surface 82 and then twisted.

During play, when the high performance yo-yo of the present invention is released and the string is fully extended, as shown in FIG. 2, outer bearing race 74 spins freely and for an extended period of time, permitting the yo-yo to sleep and allowing the performance of many tricks which require long spin times. The yo-yo is retrievable upon command. When the player flicks the string, there is momentary slack in the string, causing the string to contact ridges 30. It is believed that the momentary slack and reduction of load on the bearing causes axial play between the bearing races, which creates additional momentary friction and promotes string contact with the ridges, thereby generating sufficient friction to retrieve the yo-yo from its freely spinning condition. It is also believed that the flick of the string, which causes axial play between the bearing races, causes a temporary agitation of the ball pattern and contact of the balls with one another, which also creates additional momentary friction.

The high performance yo-yo of the present invention combines the sought after performance advantages of long spin time, or sleeping, with retrieval upon command. The axle bearing, comprising non-metallic inner and outer races, confers numerous advantages, including light weight, minimal maintenance and no lubrication requirements, durability, cost effectiveness, low friction, non-corrosiveness, consistent play under various extreme temperature and humidity conditions, and superior yo-yo play characteristics.

While in the foregoing specification this invention has been described in relation to certain preferred embodiments, and many details have been set forth for purposes of illustration, it will be apparent to those skilled in the art that the invention is susceptible to additional embodiments and that certain of the details described herein may be varied considerably without departing from the basic principles of the invention. The precise dimensions recited herein, for example, are provided for preferred embodiments and it will be recognized that dimensions varying from those disclosed herein may be used without departing from the inventive aspects of the yo-yo disclosed herein. The term "about," used herein with reference to dimensions, comprehends variances of up to 0.005 of an inch for measurements of less than 0.025 of an inch; variances of up to 0.05 of an inch for measurements of less than 0.25 of an inch and greater than 0.025 of an inch; and variances of up to 0.20 of an inch for measurements of less than 1.0 inch and greater than 0.25 of an inch.

We claim:

1. A high performance yo-yo comprising, in combination:
   two matching, generally disc-shaped yo-yo components, a central axle mountable in each yo-yo component to maintain the yo-yo components in a spaced relationship with respect to one another, the central axle having a bearing surface centered between the yo-yo components when the yo-yo components are mounted on the central axle; and
   an axle bearing mountable on the bearing surface, the axle bearing comprising a thermoplastic inner race and a thermoplastic outer race, the inner and outer races being rotatable with respect to one another, and having matching grooves retaining a plurality of balls.

2. A high performance yo-yo according to claim 1, wherein the inner and outer races of the axle bearing have matching lands that, in combination with the matching grooves, form an annular cavity retaining the plurality of balls and hold the inner and outer races in an aligned condition.

3. A high performance yo-yo according to claim 1, wherein the inner and outer races of the axle bearing are constructed from acetal.

4. A high performance yo-yo according to claim 1, wherein the inner and outer races of the axle bearing are arranged and constructed to provide clearance between the inner and outer races, permitting the inner and outer races to move with respect to one another at an angle of up to about 5° in either direction from alignment on an X-Y axis.

5. A high performance yo-yo according to claim 1, wherein the axle bearing comprises eleven balls retained between the inner and outer races.

6. A high performance yo-yo according to claim 1, wherein an inner surface of each yo-yo component has a series of ridges arranged radially around a centrally-located recess.

7. A high performance yo-yo according to claim 6, wherein about 20 to about 36 ridges having the same dimensions are provided on each yo-yo component in a radial arrangement.

8. A high performance yo-yo according to claim 7, wherein 30 ridges having the same dimensions are provided on each yo-yo component in a radial arrangement.

9. A high performance yo-yo according to claim 6, wherein each ridge projects about 0.005 to about 0.015 inches from the plane of an inner surface of the yo-yo component, is about 0.010 to about 0.024 inches wide adjacent a central recess, and extends radially for a length of about 0.060 to about 0.120 inches.

10. A high performance yo-yo according to claim 9, wherein each ridge projects about 0.008 inches from the plane of the inner surface of the yo-yo component, is about 0.016 inches wide adjacent the central recess, and extends radially for a length of about 0.090 inches.

11. A high performance yo-yo according to claim 1, wherein the yo-yo components have matching internal cavities that reduce the weight of the disc components and skew the weight distribution toward the periphery of the disc components.

12. A high performance yo-yo according to claim 1, wherein the yo-yo components are constructed from polycarbonate.

13. A high performance yo-yo according to claim 1, wherein a threaded axle component is mounted in one of the yo-yo components and an internally threaded sleeve is mounted in the other yo-yo component, whereby the threaded axle is removably mountable in the internally threaded sleeve to assemble the yo-yo components.

14. A high performance yo-yo according to claim 13, wherein the threaded axle comprises a metallic material.

15. A high performance yo-yo according to claim 14, wherein the threaded axle comprises brass.

16. A high performance yo-yo comprising, in combination, two matching, generally disc-shaped yo-yo components removably mounted in spaced relationship to one another on a central axle having a smooth bearing surface;

an axle bearing comprising an inner race and an outer race, the inner and outer races being rotatable with respect to one another and having matching grooves retaining a plurality of balls, the inner and outer races comprising a thermoplastic material and, in combination, having an inner bearing race surface mounted on the bearing surface and an outer bearing race surface exposed in the space between the yo-yo components; and a yo-yo string looped over and received on the outer bearing race.

17. A high performance yo-yo according to claim 16, wherein the axle bearing additionally comprises a plurality of metallic balls in a groove formed between the inner and outer bearing races.

* * * * *